United States Patent
Nishimura et al.

(10) Patent No.: US 8,848,293 B2
(45) Date of Patent: Sep. 30, 2014

(54) OPTICAL FILTER, OPTICAL FILTER MODULE, AND PHOTOMETRIC ANALYZER

(75) Inventors: Teruyuki Nishimura, Matsumoto (JP); Nozomu Hirokubo, Fujimi (JP)

(73) Assignee: Seiko Epson Corporation (JP)

( * ) Notice: Subject to any disclaimer, the term of this patent is extended or adjusted under 35 U.S.C. 154(b) by 322 days.

(21) Appl. No.: 13/467,360

(22) Filed: May 9, 2012

(65) Prior Publication Data
US 2012/0287438 A1 Nov. 15, 2012

(30) Foreign Application Priority Data
May 10, 2011 (JP) .................................. 2011-105011

(51) Int. Cl.
*G02B 27/00* (2006.01)
*G02B 26/00* (2006.01)
(52) U.S. Cl.
CPC .................................... *G02B 26/001* (2013.01)
USPC .......................................... 359/578; 356/454
(58) Field of Classification Search
CPC ............................... G01B 2290/25; G01J 3/28
USPC .......... 356/454, 519; 359/578, 580, 582, 585, 359/589
See application file for complete search history.

(56) References Cited

U.S. PATENT DOCUMENTS

| 6,141,139 | A | * | 10/2000 | Furlani et al. ................. 359/280 |
| 6,954,294 | B2 | * | 10/2005 | Sato .............................. 359/588 |
| 8,149,489 | B2 | | 4/2012 | Shimokawa et al. |
| 2013/0044377 | A1 | | 2/2013 | Nishimura et al. |

FOREIGN PATENT DOCUMENTS

| JP | 11-142752 | 5/1999 |
| JP | 2010-039498 | 2/2010 |

* cited by examiner

*Primary Examiner* — Jonathan Hansen
(74) *Attorney, Agent, or Firm* — Harness, Dickey & Pierce, P.L.C.

(57) ABSTRACT

An optical filter includes a first substrate, a second substrate opposed to the first substrate, a first optical film provided on a surface of the first substrate facing the second substrate, a second optical film provided on the second substrate and opposed to the first optical film via a gap, a first electrode provided on the surface of the first substrate facing the second substrate, and a second electrode provided on the second substrate and opposed to the first electrode, wherein a first charged body film with charge is formed on top of the first optical film, a second charged body film with charge is formed on top of the second optical film, and the first charged body film and the second charged body film are charged with the same polarity and opposed.

7 Claims, 7 Drawing Sheets

OPTICAL FILTER, OPTICAL FILTER MODULE, AND PHOTOMETRIC ANALYZER

BACKGROUND

1. Technical Field

The present invention relates to an optical filter, an optical filter module, and a photometric analyzer.

2. Related Art

In related art, an optical filter that extracts a light having a specific wavelength from light having plural wavelengths has been known. As an example of the optical filter, there is a tunable interference filter, for example.

The tunable interference filter is an optical filter in which optical films formed on substrates are oppositely provided and a gap between the optical films is changed by an external force to transmit a light having a wavelength in response to the gap dimension (see Patent Document 1 (JP-A-11-142752)).

However, in the tunable interference filter having the above described configuration, as the gap between optical films is made smaller by an external force, the substrates are deformed in the parts in which the optical films are formed and flatness within the optical film surfaces may not be ensured. Accordingly, there are problems that it is impossible to ensure a uniform gap within the surfaces of the opposed optical films and spectroscopic accuracy of the optical filter is reduced.

SUMMARY

An advantage of some aspects of the invention is to solve at least a part of the problems described above, and the invention can be implemented as the following forms or application examples.

Application Example 1

This application example is directed to an optical filter including a first substrate, a second substrate opposed to the first substrate, a first optical film provided on a surface of the first substrate facing the second substrate, a second optical film provided on the second substrate and opposed to the first optical film via a gap, a first electrode provided on the surface of the first substrate facing the second substrate, and a second electrode provided on the second substrate and opposed to the first electrode, wherein a first charged body film with charge is formed on top of the first optical film, a second charged body film with charge is formed on top of the second optical film, and the first charged body film and the second charged body film are charged with the same polarity and opposed.

According to the configuration, the first charged body film and the second charged body film are charged with the same polarity, and thus, a Coulomb force acts between them and becomes a repulsive force for the forces that deform the respective substrates. In this manner, the deformation of the surfaces on which the optical films are formed by an external force may be suppressed, flatness of the first optical film and the second optical film may be kept, and a uniform gap without variations may be ensured within the surfaces of the optical films. Thus, the spectroscopic accuracy of the optical filter can be improved.

Application Example 2

In the optical filter according to the application example, it is desirable that the first charged body film and the second charged body film are films having light transmissivity.

According to the configuration, the first charged body film and the second charged body film have light transmissivity, and thus, they may be formed without affecting the respective optical films having reflection characteristics and transmission characteristics of light.

Application Example 3

In the optical filter according to the application example, it is desirable that the first charged body film and the second charged body film are formed in optical paths of light on the first optical film and the second optical film.

According to the configuration, the first charged body film and the second charged body film are formed in the optical paths of the respective optical films requiring flatness, and deformation of the surfaces on which the optical films are formed may be suppressed by the repulsive forces acting on the respective charged body films and the optical films in the optical paths may be flattened. Therefore, a uniform gap may be formed within the surfaces of the optical films.

Application Example 4

In the optical filter according to the application example, it is desirable that the second substrate includes a movable part provided with the second optical film and a connection holding part that movably holds the movable part in a substrate thickness direction, and the connection holding part is continuously formed around the movable part and has a smaller thickness dimension than that of the movable part.

According to the configuration, the movable part is continuously formed to the connection holding part and held. The connection holding part has a diaphragm structure thinner than that of the movable part, and the movable part easily moves in movement in the thickness direction. In the structure, deformation of the substrate in the movable part may be made smaller, and a more uniform gap may be formed within the surfaces of the optical films together with the repulsive force by the first charged body film and the second charged body film.

Application Example 5

This application example is directed to an optical filter module including the optical filter, and a light receiving unit that receives light transmitted through the optical filter. According to the configuration, the optical filter that may ensure the uniform gap within the surfaces of the opposed optical films is provided, and the optical filter module that performs measurement of the amount of light with high accuracy may be obtained.

Application Example 6

This application example is directed to a photometric analyzer including the optical filter, a light receiving unit that receives light transmitted through the optical filter, and an analytical processing unit that analyzes optical properties of the light based on a signal obtained from the light receiving unit.

According to the configuration, the above described filter and the optical filter module including the light receiving unit are provided, and measurement of the amount of light with high accuracy may be performed. Further, by performing photo-analytical processing based on the measurement result, accurate spectroscopic characteristics may be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments implementing the invention will be explained with reference to the drawings. Note that, in the respective drawings used for the following explanation, ratios of dimensions of the respective members are appropriately changed for recognizable sizes of the respective members.

First Embodiment

Figure 1:
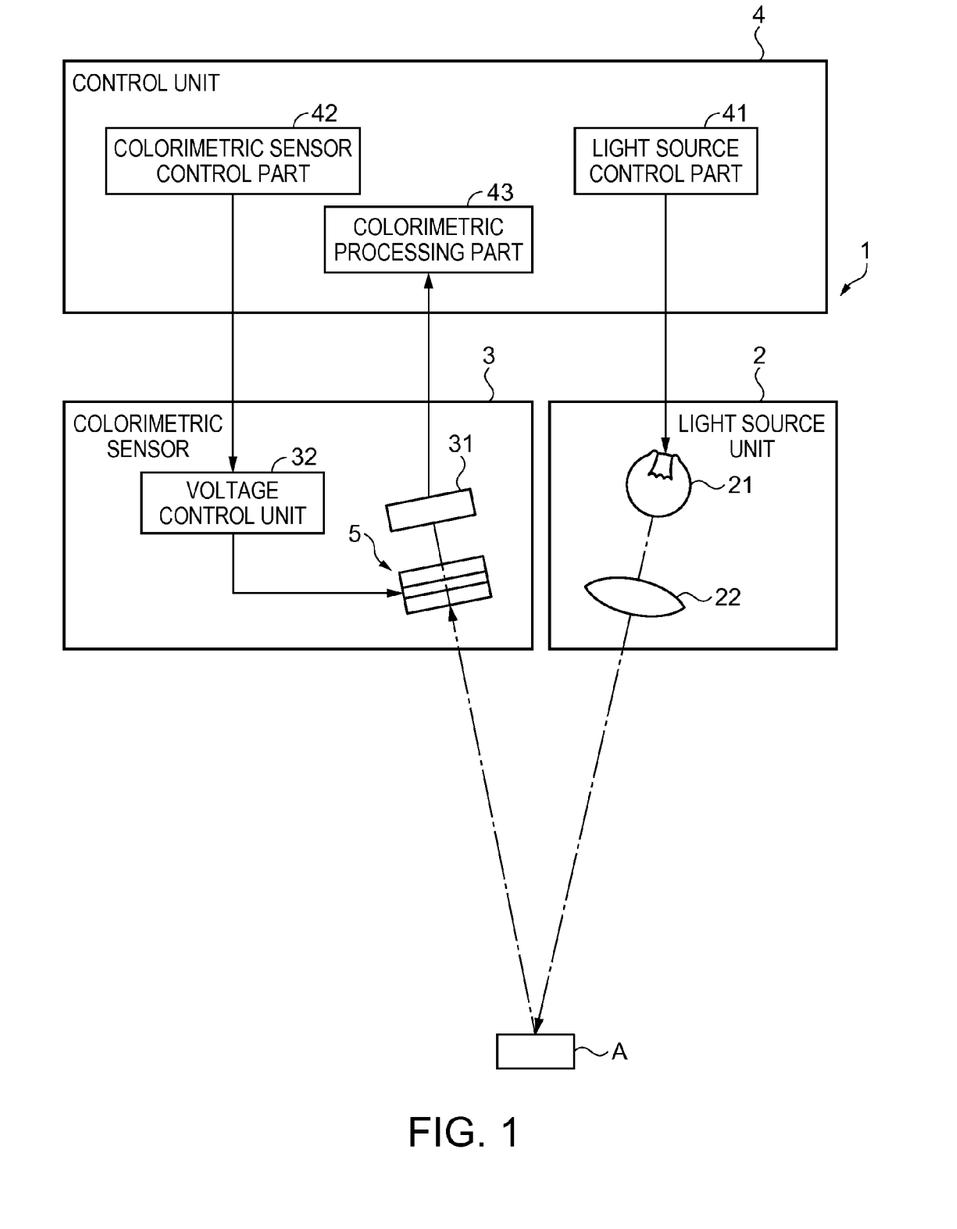
FIG. 1 is a block diagram showing a schematic configuration of a colorimetric instrument of the first embodiment.

As below, the first embodiment according to the invention will be explained according to the drawings.
Schematic Configuration of Colorimetric Instrument FIG. 1 is a block diagram showing a schematic configuration of a colorimetric instrument as a photometric analyzer.

The colorimetric instrument 1 includes a light source unit 2 that applies light to a test object A, a colorimetric sensor 3 (optical filter module), and a control unit 4 that controls the entire operation of the colorimetric instrument 1.

The colorimetric instrument 1 is a device that applies light to the test object A from the light source unit 2, receives the test object light reflected from the test object A in the colorimetric sensor 3, and analyzes and measures the chromaticity of the test object light based on the detection signal output from the colorimetric sensor 3.
Configuration of Light Source Unit The light source unit 2 includes a light source 21 and plural lenses 22 (only one is shown in FIG. 1), and outputs white light to the test object A. Further, the plural lenses 22 may include a collimator lens, and, in this case, the light source unit 2 brings the light output from the light source 21 into parallel light by the collimator lens and outputs it from a projection lens (not shown) toward the test object A.

Note that, in the embodiment, the colorimetric instrument 1 including the light source unit 2 is exemplified, however, for example, in the case where the test object A is a light emitting member, a colorimetric instrument may be formed without the light source unit 2.
Configuration of Colorimetric Sensor The colorimetric sensor 3 includes an etalon (tunable interference filter) 5 as an optical filter, a voltage control unit 32 that controls the voltage applied to the electrostatic actuator and varies the wavelength of the light to be transmitted through the etalon 5, and a light receiving unit 31 that receives the light transmitted through the etalon 5. Further, the colorimetric sensor 3 includes an optical lens (not shown) that guides the reflected light (test object light) reflected on the test object A to the etalon 5. Furthermore, the colorimetric sensor 3 spectroscopically separates the test object lights entering the optical lens into lights in a predetermined wavelength range by the etalon 5, and the spectroscopically separated light is received in the light receiving unit 31.

The light receiving unit 31 includes a photoelectric conversion element such as a photodiode and generates an electric signal in response to the amount of received light. Further, the light receiving unit 31 is connected to the control unit 4, and outputs the generated electric signal as a light reception signal to the control unit 4.
Configuration of Etalon FIG. 2 is a plan view of the etalon 5, and FIG. 3 is a schematic sectional view along B-B section in FIG. 2.

Figure 2:
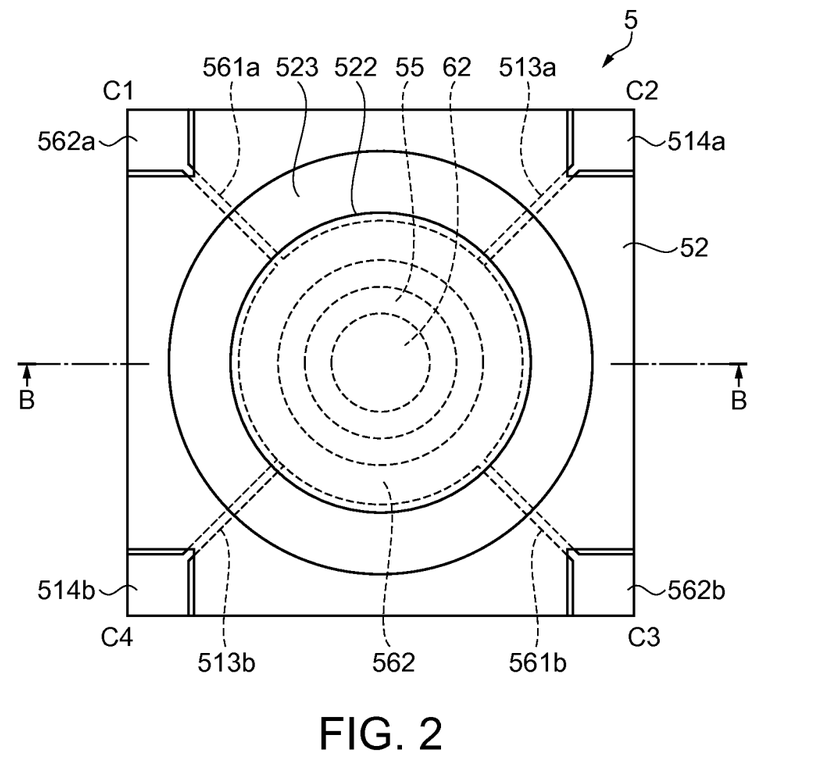
FIG. 2 is a plan view of an etalon in the first embodiment.
Figure 3:
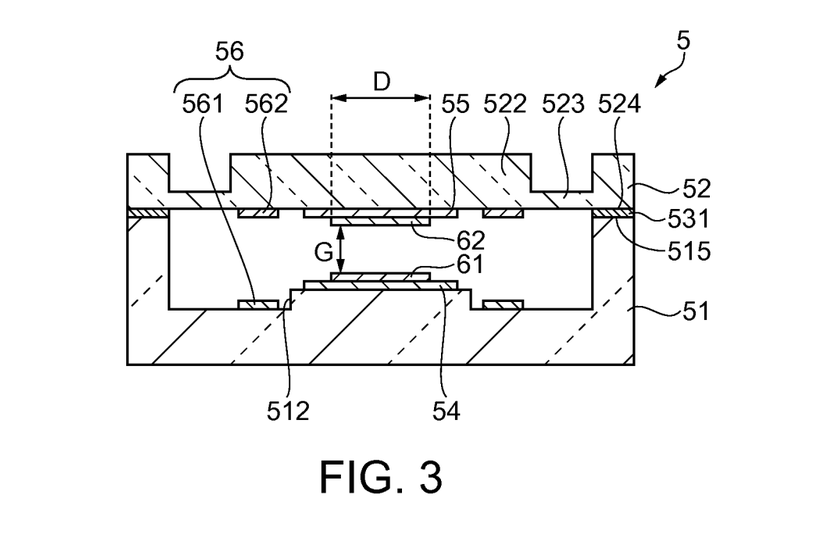
FIG. 3 is a schematic sectional view of the etalon in the first embodiment.

As shown in FIG. 2, the etalon 5 is a plate-like optical member having a square shape in the plan view, and one side is formed in 10 mm, for example. The etalon 5 includes a fixed substrate (first substrate) 51 and a movable substrate (second substrate) 52 as shown in FIG. 3.

These substrates 51, 52 are formed using a base material of various kinds of glass of soda glass, crystalline glass, quartz glass, lead glass, potassium glass, borosilicate glass, alkali-free glass, etc. or quartz by etching of a plate-like base material.

Further, in the substrates 51, 52, a first bonding surface 515 and a second bonding surface 524 are bonded via a bonding film 531 using a plasma-polymerized film.

Furthermore, a first optical film 54 and a second optical film having reflection characteristics and transmission characteristics of light are provided between the fixed substrate 51 and the movable substrate 52. Here, the first optical film 54 is fixed to the surface of the fixed substrate 51 facing the movable substrate 52, and the second optical film 55 is fixed to the surface of the movable substrate 52 facing the fixed substrate 51.

The first optical film 54 is formed in an optical film fixing part 512 at the center of the fixed substrate 51, and the second optical film 55 is formed in a movable part 522 at the center of the movable substrate 52.

The optical films 54, 55 are formed in circular shapes using AgC alloy single layers. Note that an optical film of a dielectric multilayer film containing $TiO_2$—$SiO_2$, another Ag alloy than the AgC alloy, a layered film of an Ag alloy and a dielectric film may be used.

Further, a first charged body film 61 is formed on the first optical film 54, and a second charged body film 62 is formed on the second optical film 55. Both the first charged body film 61 and the second charged body film 62 are formed using a light-transmissive material in a range of an optical path (optical path diameter: D) of the light transmitted through the first optical film 54 and the second optical film 55. The charged body films 61, 62 have circular shapes having smaller diameters than those of the optical films 54, 55. The first charged body film 61 and the second charged body film 62 are oppositely provided via a gap G.

The first charged body film 61 and the second charged body film 62 are formed by electrets, and charged with the same polarity. The electret is formed by charge injection into the vicinity of the surface of an insulating material. For the charge injection, a known method using corona discharge, an electron beam, or the like is used.

As the insulating material, a material having a high breakdown strength such as PTFE (polytetrafluoroethylene), FEP (tetrafluoroethylene-hexafluoropropene copolymer), PFA (tetra fluoro ethylene-perfluoro alkylvinyl ether copolymer), or a copolymer having a fluorine-containing aliphatic ring structure is employed.

The electret on the optical film may be formed in the manner, in which, for example, the material solved in a fluorine solvent is coated by a method of spin coating or the like and cured, and then, patterned and charge is injected therein.

Note that the higher the breakdown strength of the insulating material, the larger the amount of injected charge. The material may be appropriately selected according to the necessary amount of injected charge.

Furthermore, an electrostatic actuator 56 including a first electrode 561 provided on the fixed substrate 51 and a second electrode 562 provided in the movable part 522 of the movable substrate 52 is provided between the fixed substrate 51 and the movable substrate 52.

The electrostatic actuator 56 adjusts the gap G dimension between the first charged body film 61 and the second charged body film 62.

Further, the movable part 522 has a connection holding part 523 continuing to the movable part 522 and formed thinner than the thickness of the movable part 522 at the outer circumference side of the movable substrate 52.

As described above, the movable substrate 52 has a diaphragm structure and the movable part 522 formed in an annular shape in the etalon plan view may be movably formed in the thickness direction of the movable substrate 52.

Furthermore, a first lead electrode 513a connected to the first electrode 561 and extending toward the apex C2 of the etalon 5 and a second lead electrode 513b extending toward the apex C4 as an opposite angle of the apex C2 are provided on the fixed substrate 51. The first lead electrode 513a is connected to an electrode pad part 514a formed in a corner part of the fixed substrate 51 and the second lead electrode 513b is connected to an electrode pad part 514b formed in a corner part of the fixed substrate 51.

A third lead electrode 561a and a fourth lead electrode 561b connected to the second electrode 562 and extending toward the apexes C1, C3 of the etalon 5 are formed on the movable substrate 52.

Further, four corners of the movable substrate 52 are cut out and formed so that the electrode pad parts 514a, 514b, 562a, 562b formed in the four corners of the fixed substrate 51 may be exposed in the plan view of the etalon 5.

The lead electrodes 561a, 561b of the movable substrate 52 are connected to the electrode pad parts 562a, 562b using conducting paste for conduction from the movable substrate 52 to the fixed substrate 51 (not shown). According to the configuration, the first electrode 561 and the second electrode 562 forming the electrostatic actuator 56 are electrically independent and the respective electrodes 561, 562 may be connected from the electrode pad parts 514a, 514b, 562a, 562b of the fixed substrate 51.

Further, the voltage control unit 32 and the etalon 5 are connected via the electrode pad parts 514a, 514b, 562a, 562b. In the etalon 5 having the above described configuration, the first charged body film 61 and the second charged body film 62 are charged with the same polarity and opposed, and a Coulomb force acts on the substrates 51, 52.

Figure 4:
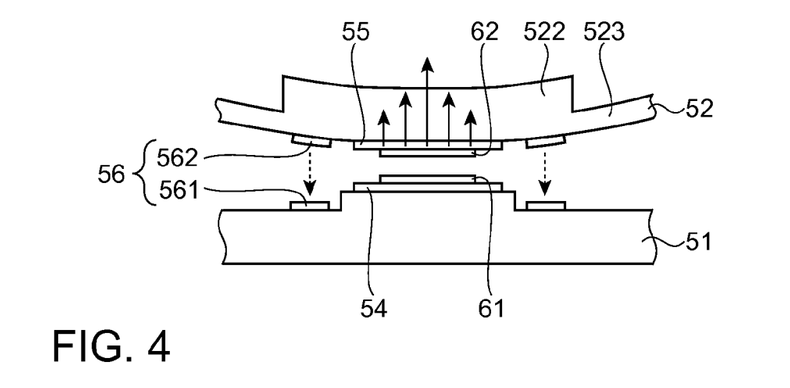
FIG. 4 is a diagram for explanation of an action of optical film parts of the etalon in the first embodiment.

FIG. 4 is a diagram for explanation of an action of the charged body films in the etalon. In the drawing, it is assumed that the fixed substrate 51 has a sufficient thickness and there is no deformation of the substrates due to driving of the electrostatic actuator 56.

When a voltage is applied to the electrostatic actuator 56, the second electrode 562 of the movable substrate 52 is attracted to the first electrode 561. In the movable substrate 52 having the diaphragm structure, the connection holding part 523 deflects and the movable part 522 is displaced closer to the first optical film 54. Concurrently, the movable part 522 of the movable substrate 52 is slightly deformed to be convex toward the fixed substrate 51 side.

Here, the charged body films 61, 62 are opposed on the surfaces of the optical films 54, 55, and a large repulsive force acts in the center part where the second charged body film 62 comes closest to the first charged body film 61 by the deformation of the movable part 522 and the repulsive force becomes smaller toward the periphery (see solid-line arrows in FIG. 4).

Accordingly, the deformation of the movable part 522 is suppressed by the repulsive force, and the second optical film 55 and the second charged body film 62 in the movable part 522 may keep flatness. That is, the optical films are flat, and variations of the gap within the surfaces of the optical films can be suppressed.

Specifically, as the gap between charged body films is decreased by the driving of the electrostatic actuator 56, deformation of the movable substrate 52 increases, however, the repulsive force may also increase and address the increasing deformation force of the substrate. This would be understood because the Coulomb force is proportional to the product of charge and inversely proportional to the square of distance.

One substrate is movable in the etalon of the embodiment, however, the same advantage is obtained if both substrates are movable.

Configuration of Voltage Control Unit

Returning to FIG. 1, the voltage control unit 32 controls the voltage applied to the first electrode 561 and the second electrode 562 of the electrostatic actuator 56 based on the control signal input from the control unit 4.

Configuration of Control Unit

The control unit 4 controls the entire operation of the colorimetric instrument 1. As the control unit 4, for example, a general-purpose personal computer, a portable information terminal, and additionally, a colorimetry-dedicated computer or the like may be used.

Further, the control unit 4 includes a light source control part 41, a colorimetric sensor control part 42, a colorimetric processing part (analytical processing unit) 43, etc. as shown in FIG. 1.

The light source control part 41 is connected to the light source unit 2. Further, the light source control part 41 outputs a predetermined control signal to the light source unit 2 based on the setting input by a user, for example, and allows the light source unit 2 to output white light with predetermined brightness.

The colorimetric sensor control part 42 is connected to the colorimetric sensor 3. Further, the colorimetric sensor control part 42 sets the wavelength of light to be received by the colorimetric sensor 3 based on the setting input by the user, for example, and outputs a control signal for detection of the amount of received light having the wavelength to the colorimetric sensor 3. Thereby, the voltage control unit 32 of the colorimetric sensor 3 sets the voltage applied to the electrostatic actuator 56 so that the wavelength of the light desired by the user may be transmitted based on the control signal.

The colorimetric processing part 43 controls the colorimetric sensor control part 42 to vary the gap between optical films of the etalon 5 and change the wavelength of the light to be transmitted through the etalon 5. Further, the colorimetric processing part 43 acquires the amount of light transmitted through the etalon 5 based on the light reception signal input from the light receiving unit 31. Furthermore, the colorimetric processing part 43 calculates the chromaticity of the light reflected from the test object A based on the amount of received lights having the respective wavelengths obtained in the above described manner.

Advantages of First Embodiment

According to the first embodiment, there are the following advantages.

In the etalon 5 according to the embodiment, the opposed first charged body film 61 and second charged body film 62 are charged with the same polarity, and the Coulomb force acts between them and becomes the repulsive force for the force that deforms the movable substrate 52. In this manner, the deformation of the movable part 522 produced by the driving of the electrostatic actuator 56 may be suppressed, flatness of the first optical film 54 and the second optical film 55 may be kept, and a uniform gap without variations may be ensured within the surfaces of the optical films. Thus, the spectroscopic accuracy of the etalon 5 can be improved.

Further, in the etalon 5, the first charged body film 61 and the second charged body film 62 having light transmissivity are formed in the optical paths of the respective optical films 54, 55, deformation of the movable substrate 52 may be suppressed by the repulsive force acting on the charged body films and the second optical film 55 in the optical path requiring flatness may be flattened. Accordingly, a uniform gap within the surfaces may be formed between the optical films. Furthermore, in the etalon 5, the movable part 522 with the second optical film 55 formed therein is formed continuously to the connection holding part 523 having a thinner thickness. Accordingly, since the diaphragm structure in which the connection holding part 523 is thinner than the movable part 522 is provided, the movable part 522 is easily deformed when the movable part 522 moves in the thickness direction. According to the structure, deformation of the movable substrate 52 in the movable part 522 may be made smaller, and a more uniform gap may be formed within the surfaces in the optical films together with the repulsive force by the first charged body film 61 and the second charged body film 62. In addition, in the driving of the electrostatic actuator 56, a pull-in phenomenon that a pulling force sharply increases when the gap between the first electrode 561 and the second electrode 562 becomes minute occurs, however, the repulsive force constantly acts between the charged body films 61, 62 and the pull-in phenomenon may be suppressed.

Since the repulsive force constantly acts between the charged body films, the first charged body film 61 of the fixed substrate 51 and the second charged body film 62 of the movable substrate 52 do not contact or stick each other, and the gap between optical films may be maintained.

By forming the colorimetric sensor (optical filter module) 3 using the etalon 5 and the light receiving unit 31 that receives the transmitted light through the etalon 5, a colorimetric sensor that realizes measurement of the amount of light with high accuracy may be obtained.

Further, by forming the colorimetric instrument 1 using the colorimetric sensor 3 and the colorimetric processing part (analytical processing unit) 43 that calculates chromaticity of light based on the signal obtained from the light receiving unit 31, measurement of the amount of light with high accuracy may be performed and the colorimetric instrument 1 that measures chromaticity based on the measurement result thereof may be provided.

Modified Examples of Embodiment

Figure 5:
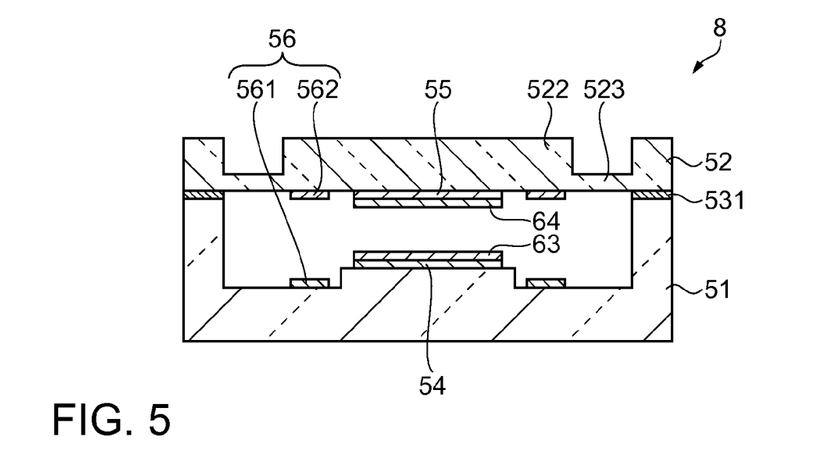
FIG. 5 is a schematic sectional view showing a modified example of the etalon in the first embodiment.

Next, a modified example of the etalon in the first embodiment will be explained.

FIG. 5 is a schematic sectional view showing a modified example of the etalon. In the modified example, the configurations of the optical films and the charged body films are different from those of the etalon of the first embodiment. The same component elements as those of the etalon of the first embodiment have the same signs and their explanation will be omitted.

The first optical film 54 is formed on the fixed substrate 51 of an etalon 8, and a first charged body film 63 is formed on the first optical film 54. The first charged body film 63 is formed in the same size as that of the first optical film 54. The second optical film 55 is formed in the movable part 522 of the movable substrate 52, and a second charged body film 64 is formed on the second optical film 55. The second charged body film 64 is formed in the same size as that of the second optical film 55. Further, the first charged body film 63 and the second charged body film 64 are oppositely provided. As described above, the first charged body film 63 covers the surface of the first optical film 54 and the second charged body film 64 covers the surface of the second optical film 55. According to the configuration, in addition to the advantages of the etalon of the first embodiment, if a metal film of Ag or the like is used for the optical films, the charged body films may serve to protect the optical films.

Figure 6A:
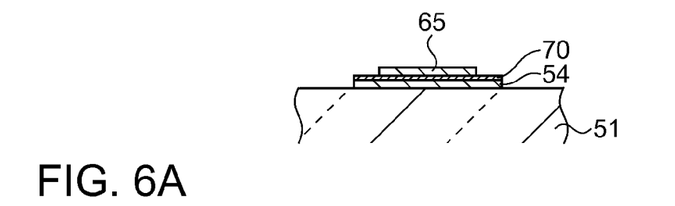
FIGS. 6A and 6B are partial sectional views showing other modified examples of the etalon in the first embodiment.
Figure 6B:
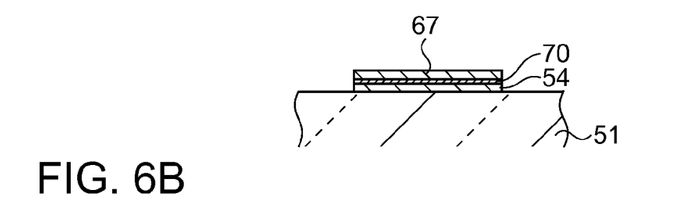

Further, as other modified examples of the optical film parts of the etalon, forms shown in FIGS. 6A and 6B may be cited. FIGS. 6A and 6B are schematic sectional views showing modified examples of the optical film parts of the etalon. In the drawings, the configurations of the movable substrate and the optical film parts provided on the fixed substrate are the same, and only the configurations of the optical film parts at the fixed substrate side are shown.

As shown in FIG. 6A, the first optical film 54 is formed on the fixed substrate 51 and a protective film 70 that covers the surface thereof is formed thereon. The protective film 70 is formed using a material such as $SiO_2$ or $Al_2O_3$ having light transmissivity.

Further, a first charged body film 65 as an optical path range of the light transmitted through the first optical film 54 is formed on the protective film 70. The first charged body film 65 is formed in the smaller dimensions than those of the first optical film 54 and the protective film 70.

Furthermore, a first charged body film 67 may be formed in the same size as those of the first optical film 54 and the protective film 70 as shown in FIG. 6B.

As described above, even the configuration in which the protective film covering the optical film is provided for protection of the optical film and the charged body film is provided thereon may have the same advantages as those of the first embodiment.

The colorimetric instrument 1 has been exemplified as the photometric analyzer, however, the optical filter, the optical filter module, and the photometric analyzer may be used in other various fields.

For example, they may be used as a light-based system for detection of presence of a specific material. As the system, for example, a gas detector such as a vehicle-mounted gas leak detector that detects a specific gas with high sensitivity by employing a spectroscopic measurement method using the etalon as an optical filter (tunable interference filter) or a photoacoustic gas detector for breath test may be exemplified.

Second Embodiment

As below, an example of the gas detector will be explained according to the drawings.

Figure 7:
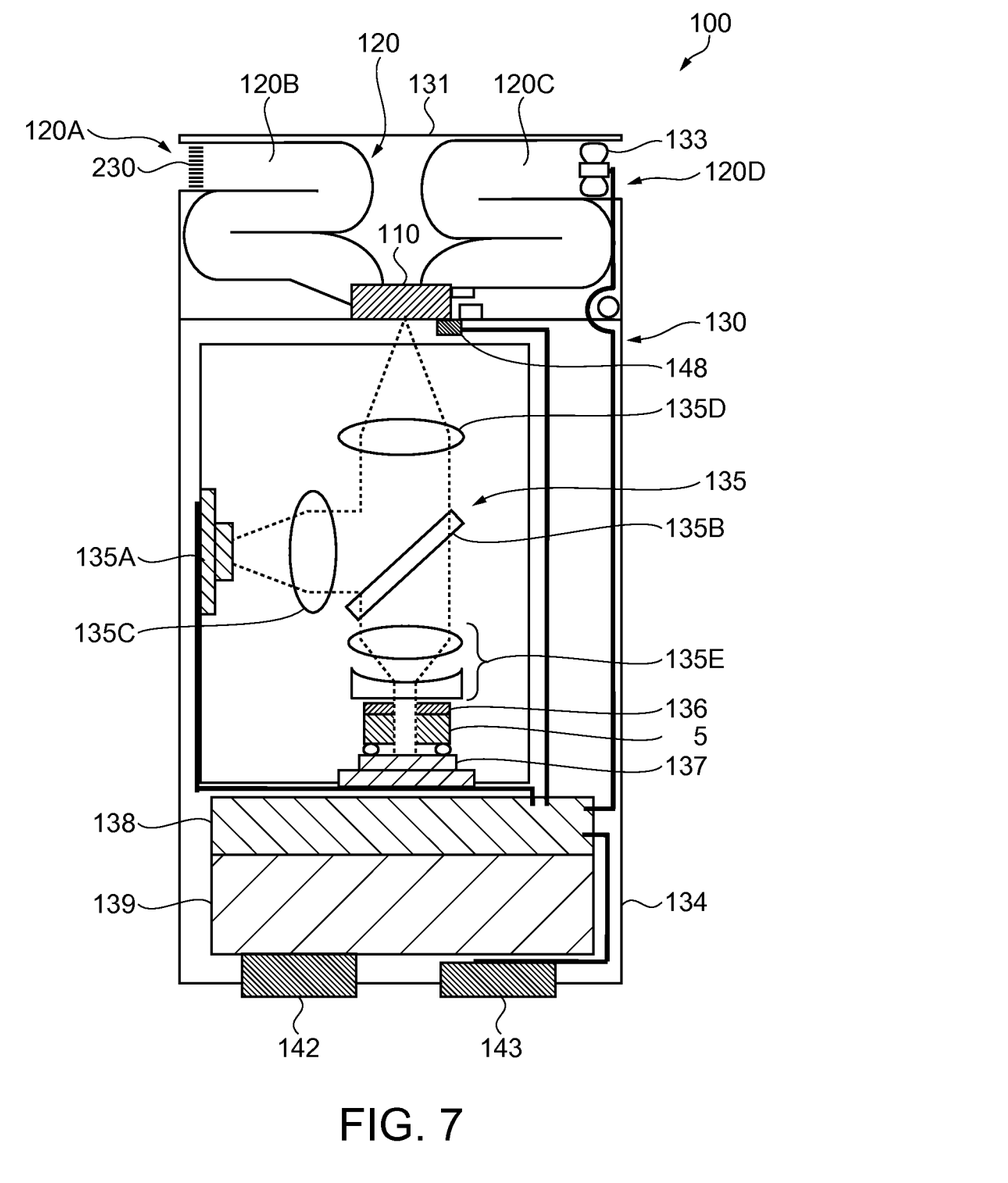
FIG. 7 is a schematic view of a gas detector as a photometric analyzer in the second embodiment.

FIG. 7 is a schematic view showing an example of the gas detector including the etalon.

Figure 8:
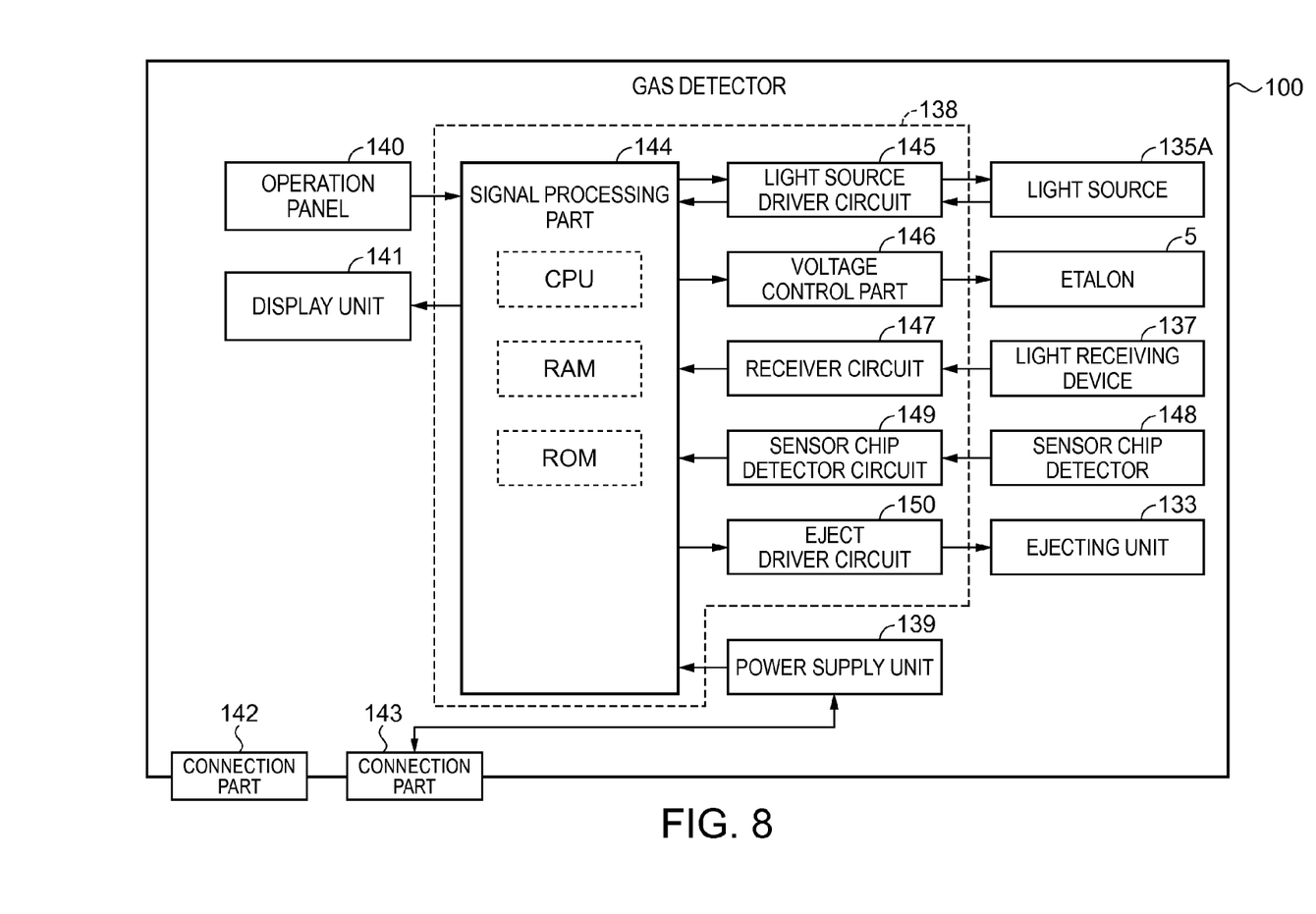
FIG. 8 is a circuit block diagram of the gas detector in the second embodiment.

FIG. 8 is a block diagram showing a configuration of a control system of the gas detector in FIG. 7.

The gas detector 100 includes a sensor chip 110, a channel 120 having a suction port 120A, a suction channel 120B, an eject channel 120C, and an eject port 120D, and a main body part 130 as shown in FIG. 7.

The main body part 130 includes a detection unit (optical filter module) including a sensor part cover 131 having an opening to which the channel 120 is detachably attached, an ejecting unit 133, a housing 134, an optical unit 135, a filter 136, the etalon (tunable interference filter) 5, a light receiving device 137 (light receiving unit), etc., a control unit 138 that processes a detected signal and controls the detection unit, a power supply unit 139 that supplies power, etc. Further, the optical unit 135 includes a light source 135A that outputs light, a beam splitter 135B that reflects the light entering from the light source 135A toward the sensor chip 110 side and transmits the light entering from the sensor chip side to the light receiving device 137 side, and lenses 135C, 135D, 135E. Further, as shown in FIG. 8, on the surface of the gas detector 100, an operation panel 140, a display unit 141, a connection part 142 for interface with the outside, and the power supply unit 139 are provided. If the power supply unit 139 is a secondary cell, a connection part 143 for charging may be provided.

Furthermore, as shown in FIG. 8, the control unit 138 of the gas detector 100 includes a signal processing part 144 having a CPU etc., a light source driver circuit 145 for control of the light source 135A, a voltage control part 146 for control of the etalon 5, a receiver circuit 147 that receives a signal from the light receiving device 137, a sensor chip detector circuit 149 that reads cords of the sensor chip 110 and receives a signal from a sensor chip detector 148 that detects presence or absence of the sensor chip 110, an eject driver circuit 150 that controls the ejecting unit 133, etc.

Next, an operation of the gas detector 100 will be explained as below.

Inside of the sensor part cover 131 in the upper part of the main body part 130, the sensor chip detector 148 is provided and presence or absence of the sensor chip 110 is detected by the sensor chip detector 148. When the signal processing part 144 detects the detection signal from the sensor chip detector 148, the part determines that the sensor chip 110 has been mounted, and outputs a display signal to the display unit 141 for displaying that a detection operation can be performed. Then, for example, if the operation panel 140 is operated by a user and an instruction signal of starting detection processing is output from the operation panel 140 to the signal processing part 144, first, the signal processing part 144 outputs a signal of light source activation to the light source driver circuit 145 and activates the light source 135A. When the light source 135A is driven, a stable laser beam of linearly-polarized light having a single waveform is output from the light source 135A. Further, a temperature sensor and a light amount sensor are contained in the light source 135A, and their information is output to the signal processing part 144. Then, if the signal processing part 144 determines that the light source 135A is in stable operation based on the temperature and the light amount input from the light source 135A, the part controls the eject driver circuit 150 to activate the ejecting unit 133. Thereby, a gas sample containing a target material (gas molecules) to be detected is guided from the suction port 120A into the suction channel 120B, the sensor chip 110, the eject channel 120C, and the eject port 120D. The sensor chip 110 is a sensor having plural metal nanostructures incorporated therein and using localized surface plasmon resonance. In the sensor chip 110, when enhanced electric fields are formed between the metal nanostructures by the laser beam and the gas molecules enter the enhanced electric fields, Raman scattering light and Rayleigh scattering light containing information of molecule oscillation are generated.

The Raman scattering light and Rayleigh scattering light enter the filter 136 through the optical unit 135, the Rayleigh scattering light is separated by the filter 136, and the Raman scattering light enters the etalon 5. Then, the signal processing part 144 controls the voltage control part 146 to adjust the voltage applied to the etalon 5 and allow the etalon 5 to spectroscopically separate the Raman scattering light in response to the gas molecules to be detected. Then, when the spectroscopically separated light is received by the light receiving device 137, the light reception signal in response to the amount of received light is output to the signal processing part 144 via the receiver circuit 147.

The signal processing part 144 compares spectrum data of the Raman scattering light in response to the gas molecules to be detected obtained in the above described manner and data stored in a ROM, determines whether or not they are the target gas molecules, and identifies the material. Further, the signal processing part 144 allows the display unit 141 to display the result information and outputs it to the outside from the connection part 142.

In FIGS. 7 and 8, the gas detector 100 that performs spectroscopic separation of the Raman scattering light using the etalon 5 and gas detection from the spectroscopically separated Raman scattering light has been exemplified, however, it may be used as a gas detector that identifies a gas type by detection of absorbance unique to the gas. In this case, a gas sensor that takes a gas inside and detects light absorbed by the gas of the incident lights is used as the optical filter module according to the invention. Further, a gas detector that analyzes and discriminates the gas flowing into the sensor using the gas sensor is the photometric analyzer according to the invention. Even the configuration may detect components of the gas using the tunable interference filter according to the invention.

Further, as a system for detection of presence of a specific material, not limited to the gas detection, but also a material component analyzer such as a non-invasive measurement device of sugar using near-infrared spectroscopy or a non-invasive measurement device of information of foods, living organisms, minerals, or the like may be exemplified.

Third Embodiment

Next, a food analyzer as an example of the material component analyzer will be explained.

Figure 9:
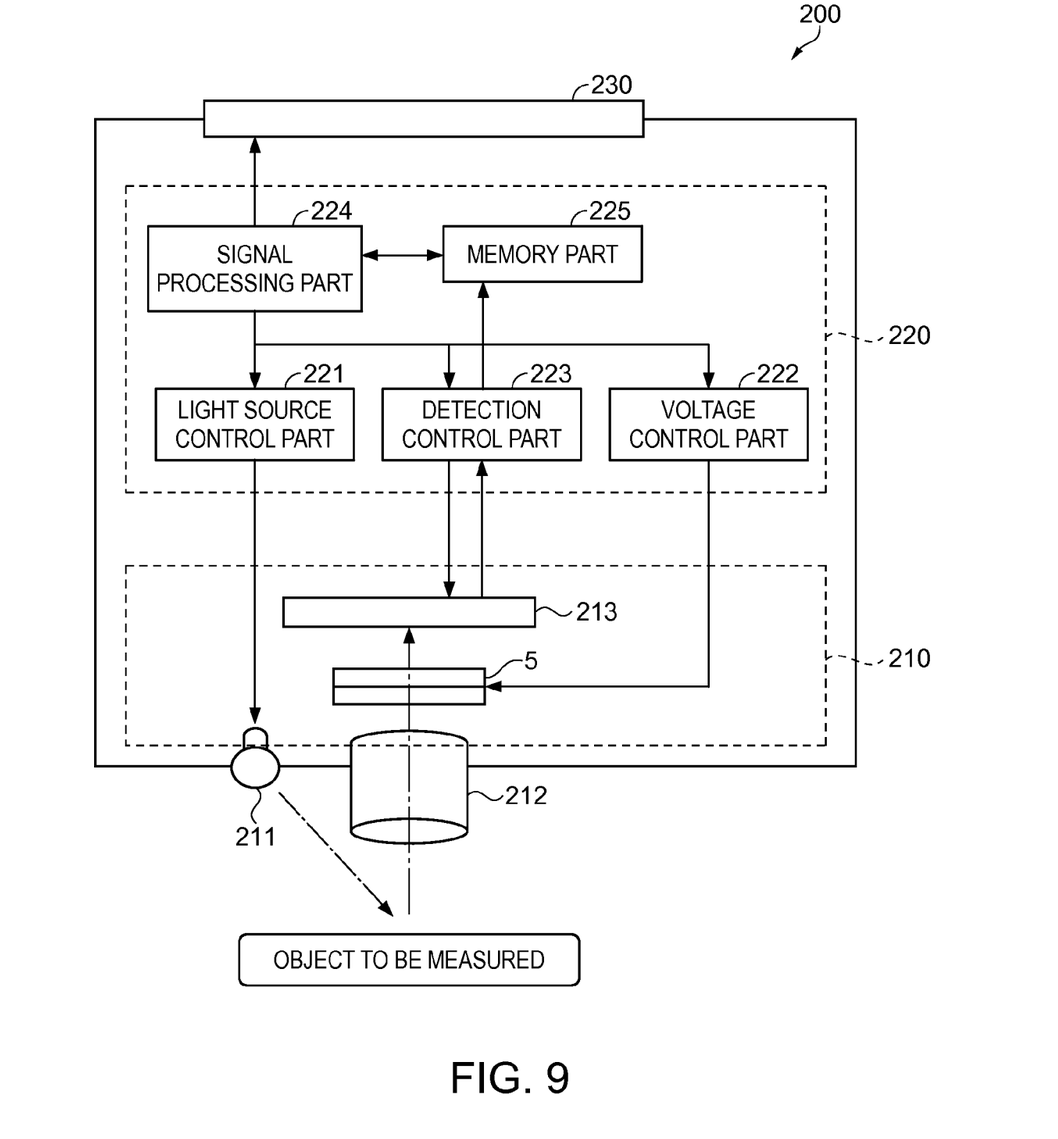
FIG. 9 is a block diagram showing a configuration of a food analyzer as a photometric analyzer in the third embodiment.

FIG. 9 shows a schematic configuration of a food analyzer as an example of the photometric analyzer using the etalon 5. As shown in FIG. 9, the food analyzer 200 includes a detector (optical filter module) 210, a control unit 220, and a display unit 230. The detector 210 includes a light source 211 that outputs light, an imaging lens 212 that introduces light from an object to be measured, the etalon (tunable interference filter) 5 that spectroscopically separates the light introduced from the imaging lens 212, and an imaging unit 213 (light receiving unit) that detects the spectroscopically separated light.

Further, the control unit 220 includes a light source control part 221 that performs turn-on and turn-off control and brightness control when turned on of the light source 211, a voltage control part 222 that controls the etalon 5, a detection control part 223 that controls the imaging unit 213 and acquires a spectroscopically separated image imaged by the imaging unit 213, a signal processing part 224, and a memory part 225. In the food analyzer 200, when the system is driven, the light source 211 is controlled by the light source control part 221, and the object to be measured is irradiated with light from the light source 211. Then, the light reflected by the object to be measured passes through the imaging lens 212 and enters the etalon 5. A voltage that enables spectroscopic separation of a desired wavelength is applied to the etalon 5 under the control of the voltage control part 222, and the spectroscopically separated light is imaged in the imaging unit 213 including a CCD camera etc., for example. Further, the imaged light is accumulated as spectroscopically separated images in the memory part 225. Furthermore, the signal processing part 224 controls the voltage control part 222 to change the voltage value applied to the etalon 5, and acquires the spectroscopically separated images for the respective wavelengths.

Then, the signal processing part 224 performs computation processing on data of respective pixels in the respective images accumulated in the memory part 225, and obtains spectra in the respective pixels. Further, for example, information on components of foods with respect to the spectra is stored in the memory part 225. The signal processing part 224 analyzes the obtained spectrum data based on the information on the foods stored in the memory part 225, and obtains food components contained in the object to be detected and their contents. Further, from the obtained food components and contents, food calories, freshness, etc. may be calculated. Furthermore, by analysis of the spectrum distribution within the image, extraction of a part in which freshness has been deteriorated in the food to be inspected or the like may be performed, and detection of foreign materials contained within the foods or the like may be performed.

Then, the signal processing part 224 performs processing of allowing the display unit 230 to display the information on the components, contents, calories, freshness, etc. of the food to be inspected obtained in the above described manner.

FIG. 9 shows the example of the food analyzer 200, however, a device having nearly the same configuration may be used as the above described non-invasive measurement device of other information. For example, the device may be used as a living organism analyzer that performs analysis of living organism components such as measurement, analysis, or the like of body fluid components of blood or the like. The living organism analyzer as a device for measurement of the body fluid components of blood or the like, for example, as a device for sensing ethyl alcohol, may be used as a drunk driving prevention device that detects the influence of alcohol of a driver. Further, the device may be used as an electronic endoscopic system including the living organism analyzer.

Furthermore, the device may be used as a mineral analyzer that performs component analyses of minerals.

In addition, the optical filter, the optical filter module, and the photometric analyzer according to the invention may be applied to the following devices.

For example, by changing the intensity of the lights having respective wavelengths with time, data can be transmitted by the lights having the respective wavelengths. In this case, a light having a specific wavelength is spectroscopically separated by the tunable interference filter provided in the optical filter module and received by the light receiving unit, and thereby, the data transferred by the light having the specific wavelength may be extracted. Optical communications may be performed by processing the data of the lights having respective wavelengths using the photometric analyzer having the optical filter module for data extraction.

Fourth Embodiment

Further, as the photometric analyzer, the configuration may be applied to a spectroscopic camera, a spectroscopic analyzer, etc. that image spectroscopically separated images by spectroscopic separation of light using the etalon (tunable interference filter) according to the invention. As an example of the spectroscopic camera, there is an infrared camera containing the etalon.

Figure 10:
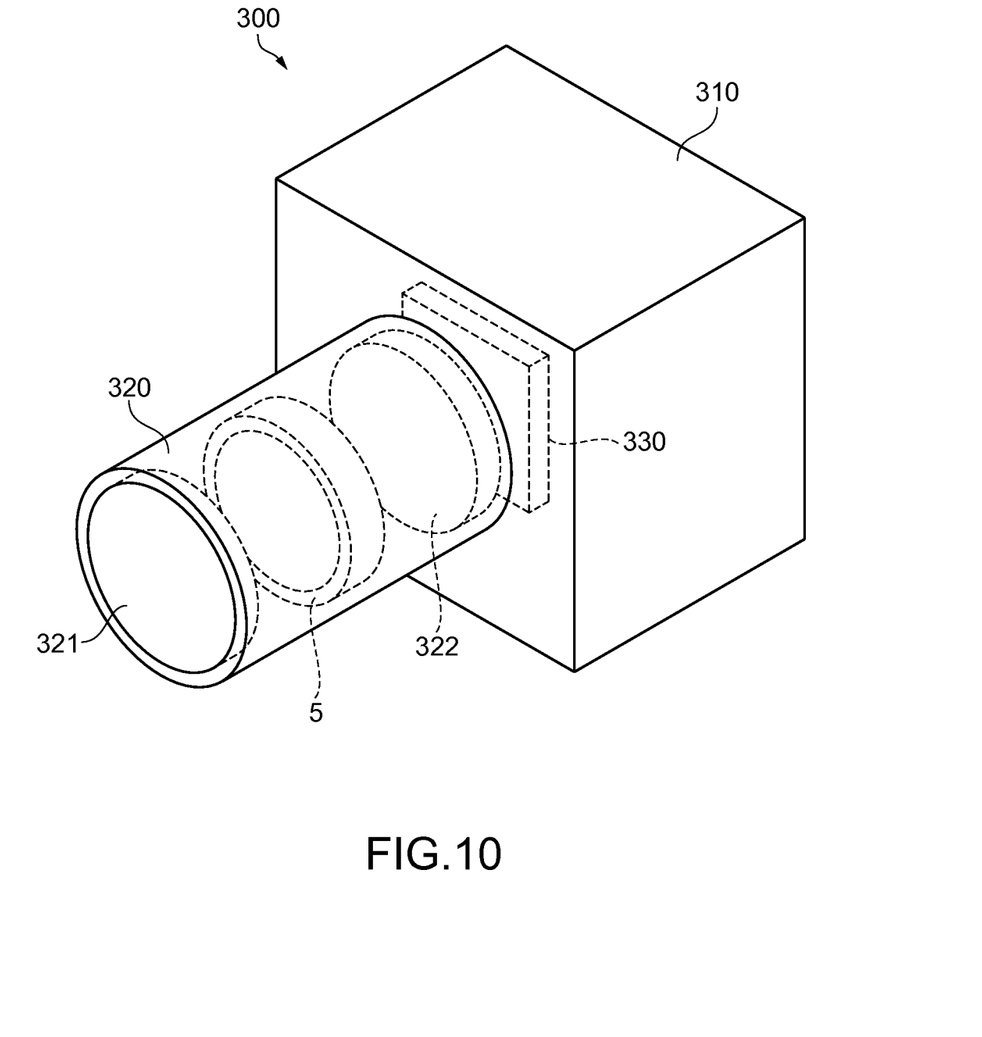
FIG. 10 is a schematic view showing a configuration of a spectroscopic camera as a photometric analyzer in the third embodiment.

FIG. 10 is a diagram showing a schematic configuration of a spectroscopic camera. As shown in FIG. 10, the spectroscopic camera 300 includes a camera main body 310, an imaging lens unit 320, and an imaging unit 330.

The camera main body 310 is a part to be grasped and operated by a user.

The imaging lens unit 320 is provided in the camera main body 310 and guides entering image light to the imaging unit 330.

Further, the imaging lens unit 320 includes an objective lens 321, an image forming lens 322, and the etalon 5 provided between these lenses as shown in FIG. 10.

The imaging unit 330 includes a light receiving device and images the image light guided by the imaging lens unit 320. In the spectroscopic camera 300, a light having a wavelength to be imaged is transmitted through the etalon 5, and thereby, a spectroscopically separated image of a light having a desired wavelength may be obtained.

Furthermore, the etalon according to the invention may be used as a bandpass filter, and, for example, may be used as an optical laser device that spectroscopically separates and transmits only lights in a narrow band around a predetermined wavelength of the lights in a predetermined wavelength range output by a light emitting device using the tunable interference filter. Further, the etalon according to the invention may be used as a biometric identification device, and, for example, may be applied to an identification device of blood vessels, finger prints, retina, iris, or the like using lights in the near-infrared range and the visible range.

Furthermore, the optical filter module and the photometric analyzer may be used as a concentration detector. In this case, the concentration of an object to be inspected in a sample is measured by spectroscopic separation and analysis of infrared energy (infrared light) output from a material using the etalon.

As shown above, the optical filter, the optical filter module, and the photometric analyzer according to the invention may be applied to any device that spectroscopically separates a predetermined light from incident lights. Further, as described above, the etalon according to the invention may spectroscopically separate plural wavelengths by one device, and thus, measurement of spectra of the plural wavelengths and detection of plural components may be performed with high accuracy. Therefore, compared to the device in the past that extracts a desired wavelength using plural devices, downsizing of the optical filter module and the photometric analyzer may be promoted and the etalon may preferably be used as a portable or vehicle-mounted optical device, for example.

The invention is not limited to the embodiments that have been explained, however, specific structures and procedures when the invention is implemented may appropriately be changed to other structures within a range in which the purpose of the invention may be achieved. Further, many modifications may be made by a person who has ordinary skill in the art within the technical ideas of the invention.

The entire disclosure of Japanese Patent Application No. 2011-105011, filed May 10, 2011 is expressly incorporated by reference herein.

What is claimed is:

1. An optical filter comprising:
   a first substrate;
   a second substrate opposed to the first substrate;
   a first optical film provided on a surface of the first substrate facing the second substrate;
   a second optical film provided on the second substrate and opposed to the first optical film via a gap;
   a first electrode provided on the surface of the first substrate facing the second substrate; and
   a second electrode provided on the second substrate and opposed to the first electrode,
   wherein a first charged body film with charge is formed on top of the first optical film,
   a second charged body film with charge is formed on top of the second optical film, and
   the first charged body film and the second charged body film are charged with the same polarity and opposed.

2. The optical filter according to claim 1, wherein the first charged body film and the second charged body film are films having light transmissivity.

3. The optical filter according to claim 2, wherein the first charged body film and the second charged body film are formed in optical paths of light on the first optical film and the second optical film.

4. The optical filter according to claim 1, wherein the second substrate includes a movable part provided with the second optical film and a connection holding part that movably holds the movable part in a substrate thickness direction, and
   the connection holding part is continuously formed around the movable part and has a smaller thickness dimension than that of the movable part.

5. An optical filter module comprising:
   the optical filter according to claim 1; and
   a light receiving unit that receives light transmitted through the optical filter.

6. A photometric analyzer comprising:
   the optical filter according to claim 1;
   a light receiving unit that receives light transmitted through the optical filter; and
   an analytical processing unit that analyzes optical properties of the light based on a signal obtained from the light receiving unit.

7. An optical filter comprising:
   a first optical film provided on a first substrate;
   a second optical film provided on a second substrate and opposed to the first optical film via a gap,
   wherein a first charged body film with charge is formed on top of the first optical film,
   a second charged body film with charge is formed on top of the second optical film, and
   the first charged body film and the second charged body film are charged with the same polarity and opposed.

* * * * *